US011077517B2

(12) United States Patent
Smitherman et al.

(10) Patent No.: US 11,077,517 B2
(45) Date of Patent: Aug. 3, 2021

(54) PORTABLE FRICTION STIR WELDING REPAIR TOOL

(71) Applicant: Concurrent Technologies Corporation, Johnstown, PA (US)

(72) Inventors: Mark. T. Smitherman, Johnstown, PA (US); Timothy G. Freidhoff, Johnstown, PA (US); Paul I. Sleppy, Penn Run, PA (US); Daniel B. George, II, Homer City, PA (US); James C. McHenry, Latrobe, PA (US); Alan W. Baum, Orlando, FL (US)

(73) Assignee: Concurrent Technologies Corporation, Johnstown, PA (US)

( * ) Notice: Subject to any disclaimer, the term of this patent is extended or adjusted under 35 U.S.C. 154(b) by 521 days.

(21) Appl. No.: 15/832,943

(22) Filed: Dec. 6, 2017

(65) Prior Publication Data

US 2018/0161915 A1    Jun. 14, 2018

Related U.S. Application Data

(60) Provisional application No. 62/430,416, filed on Dec. 6, 2016.

(51) Int. Cl.
*B23K 20/12* (2006.01)

(52) U.S. Cl.
CPC .......... *B23K 20/125* (2013.01); *B23K 20/123* (2013.01); *B23K 20/127* (2013.01); *B23K 20/1255* (2013.01)

(58) Field of Classification Search
CPC .. B23K 20/1225; B23K 20/85; B23K 37/027; B23K 7/107; B23K 20/122–1285; B23Q 9/0021; B23Q 9/0057
USPC ........................................................ 409/179
See application file for complete search history.

(56) References Cited

U.S. PATENT DOCUMENTS

| | | | | | |
|---|---|---|---|---|---|
| 2,388,376 | A | * | 11/1945 | Young | B23K 7/004 33/27.01 |
| 2,390,938 | A | * | 12/1945 | Hubbell | B23K 7/107 33/27.04 |
| 2,411,182 | A | * | 11/1946 | Anderson | B23K 7/107 33/27.04 |
| 2,452,718 | A | * | 11/1948 | Blythe | B23K 7/107 33/27.03 |
| 2,463,075 | A | * | 3/1949 | Young | B23K 7/107 33/27.03 |

(Continued)

*Primary Examiner* — Erin B Saad
*Assistant Examiner* — Carlos J Gamino
(74) *Attorney, Agent, or Firm* — Buchanan Ingersoll & Rooney PC

(57) ABSTRACT

Embodiments can include a self-reacting friction stir weld ("FSW") tool. The device can be configured to be portable and produce full penetration welds in situ. The FSW tool can include a system that cuts out a portion of the structure surrounding a defective portion of the structure. A work-piece can be inserted within the removed portion and friction stir welded to the structure via the FSW tool. A superior repair as compared to merely welding the defect can be achieved by replacing a portion of the structure surrounding the defect as opposed to merely welding the defect (e.g., the crack). A controlled geometric shaped weld beam can be generated for the interface between the work-piece and the structure, which may led to a stronger, more reliable weld.

16 Claims, 11 Drawing Sheets

(56) References Cited

U.S. PATENT DOCUMENTS

| | | | | |
|---|---|---|---|---|
| 2,910,289 | A * | 10/1959 | Grubish | B23Q 9/0021 |
| | | | | 266/54 |
| 3,176,587 | A * | 4/1965 | Appleton | B23K 37/0217 |
| | | | | 409/84 |
| 3,797,813 | A * | 3/1974 | Roesel | B23K 7/102 |
| | | | | 266/54 |
| 4,109,635 | A * | 8/1978 | Rossborough | B24B 23/08 |
| | | | | 125/10 |
| 4,256,288 | A * | 3/1981 | Rojas | B23K 7/107 |
| | | | | 266/70 |
| 4,438,600 | A * | 3/1984 | Berbakov | B24B 23/08 |
| | | | | 219/125.11 |
| 5,460,317 | A | 10/1995 | Thomas et al. | |
| 6,103,184 | A * | 8/2000 | Heck | B23K 7/107 |
| | | | | 266/48 |
| 6,450,395 | B1 * | 9/2002 | Weeks | B23K 20/1245 |
| | | | | 228/112.1 |
| 6,843,328 | B2 | 1/2005 | Boyl-Davis et al. | |
| 8,297,157 | B1 * | 10/2012 | Miller | B23C 3/007 |
| | | | | 408/211 |
| 2003/0102355 | A1 | 6/2003 | Shepherd | |
| 2004/0035914 | A1 * | 2/2004 | Hempstead | B23K 20/1255 |
| | | | | 228/112.1 |
| 2005/0172467 | A1 * | 8/2005 | Hamann | B23Q 7/047 |
| | | | | 29/56.5 |
| 2009/0065553 | A1 | 3/2009 | Burg et al. | |
| 2013/0334289 | A1 | 12/2013 | Pacchione et al. | |
| 2015/0084247 | A1 * | 3/2015 | Williams | B23K 37/0217 |
| | | | | 266/54 |

* cited by examiner

PORTABLE FRICTION STIR WELDING REPAIR TOOL

CROSS-REFERENCE TO RELATED APPLICATIONS

This patent application is related to and claims the benefit of priority to U.S. Provisional Patent Application No. 62/430,416, entitled "Portable Friction Stir Repair Tool" filed on Dec. 6, 2016, which is hereby incorporated by reference in its entirety.

STATEMENT REGARDING FEDERALLY SPONSORED RESEARCH OR DEVELOPMENT

This invention was made with government support under Grant No. ONR FNC Friction Stir Repair Tool N00014-15-C-0035, 02842 (Base Period task 001) awarded by the Office of Naval Research. The Government has certain rights in the invention.

FIELD OF THE INVENTION

Embodiments of the invention can include a tool that can be used to perform a friction stir weld on a structure in situ.

BACKGROUND OF THE INVENTION

Structures such as ship hulls, ship superstructures, cargo plane flooring, etc. can require maintenance. Damage, stress, and wear can cause defects in the structure that may weaken the structure, cause it to be unsatisfactory for its intended use, and/or render the object to which the structure is attached inoperable. Methods of maintenance and repair can include welding. For instance, if a hull of a ship develops a crack, the crack can be welded so as to seal the crack. Yet, many of these structures comprise materials that can make weld-type repairs difficult. For instance, some welding may require use of welding material that is different from the material of the structure. Further, the resultant weld may have a microstructure that differs from the microstructure of the structure. Additionally, many of these structures may be placed into service within environments in which certain types of welding (e.g., arc, flash, gas, fusion etc.) may be dangerous.

The construction of such structures may require welding of structural components together. Yet, conventional weld-type construction techniques can suffer from the same or additional limitations. Thus, whether a weld is begin performed for new construction purposes or for repair purposes, conventional welding methods may not provide an effective and efficient means to perform an adequate weld.

Friction stir welding is a process that can make use of frictional heat to cause plastic work on a work-piece. The process can include use of a tool tip that is rotated and pressed into a work-piece to strain and mix the work-piece material, where the frictional heat plasticizes the work-piece material that is being strained and mixed. The tool tip can also be traversed along a path of the work-piece. As it moves along the work-piece, the plasticized material may cool and consolidate to form the weld. With friction stir welding, a first work-piece can be placed adjacent a second work-piece and the tool tip can be caused to plasticize the regions that form the interface between the two work-pieces. Upon cooling, the plasticized material at the interface consolidates to form a unitary member comprising both work-pieces.

Examples of prior art friction stir welding methods and systems can include, for example, U.S. Pat. Nos. 5,460,317; 6,843,328; U.S. Publication No. 2003/0102355; U.S. Publication No. 2009/0065553; and U.S. Publication No. 2013/0334289.

Friction stir welding can have many advantages over other forms of welding. These can include generating a weld without the sparks, flame, and/or gases associated with other forms of welding, obviating use of material that is not the same or similar to the work-piece(s), performing solid state welding, performing a weld without melting the material, performing a weld that requires less heat energy input as compared to other forms of welding, performing autogenous welding, performing a weld with superior grain refinement and without sensitization, etc. However, friction stir welding techniques generally require relatively large mechanical forces to stabilize the tool tip, to cause the tool tip to traverse along the work-piece(s), and to hold the work-piece(s) stationary during the process. With prior art friction stir welding techniques, it may be difficult to perform a weld on a portion of a structure in situ (e.g., performing the weld on the portion of the structure while the structure is still intact with the object).

The present invention is directed toward overcoming one or more of the above-identified problems.

BRIEF SUMMARY OF THE INVENTION

Embodiments of the present invention can include a Friction Stir Welding ("FSW") tool. The FSW tool can be configured to perform welds in situ, which may include full penetration welds. The FSW tool can be further configured as a portable, self-reacting device. The FSW tool can include a system and a method that cuts out a portion of the structure surrounding a defective portion within the structure. A work-piece can be inserted within the cut-out portion and friction stir welded to the structure via the FSW tool. A superior repair of a defective portion of a structure can be achieved by replacing a portion of the structure surrounding the defect as opposed to merely welding the defect (e.g., the crack).

The FSW tool can further include a system and a method that welds a work-piece to a structure without the structure having a defective portion. This can include welding a work-piece to a structure without forming a cut-out portion within the structure.

In an exemplary embodiment, an embodiment of the tool can include a mounting gear securable to a portion of a member. The tool can further include spindle arm rotatingly securable to the mounting gear. The spindle arm may further include a tool tip aperture. The tool may further include a drive gear rotatingly securable to the spindle arm and configured to engage the mounting gear. The tool may further include at least one of a tool tip and an end mill bit, where each may be configured to be received by the tool tip aperture. The tool tip aperture may be configured to rotatingly secure the tool tip and/or the end mill bit to the spindle arm. The tool may be further configured such that when the drive gear is actuated, the spindle arm can be manipulated to cause the tool tip aperture to traverse a path defined by a geometric shape of the mounting gear.

In some embodiments, the member can be at least one of a structure of an object and a work-piece. In some embodiments, the end mill bit can be configured to cut through the member when the end mill bit. In some embodiments, the tool tip can be configured to generate at least one stir zone within the member via friction stir welding.

In some embodiments, the member can be a work-piece having a work-piece profile configured to form a butt joint between the work-piece and an edge of a removed portion of a structure of an object and/or a lap joint between the work-piece and a portion of a structure. The tool tip may be configured to generate at least one stir zone within the work-piece and the structure via friction stir welding when the tool tip is within the tool tip aperture and the tool tip is caused to rotate.

In some embodiments, the tool tip can be configured as a bobbin-style tool tip for friction stir welding. In some embodiments, the tool tip can further include a shaft forming a first shoulder, a probe extending from the first shoulder, and a body forming a second shoulder. In some embodiments, the body can be removably attached to the probe. In some embodiments, a distance between the first shoulder and the second shoulder can be adjustable.

In some embodiments, the member may have a first side and a second side. The mounting gear may be securable to the first side. The tool tip may be configured to generate a stir zone via friction stir welding within at least one of the first side and the second side of the member.

In some embodiments, the work-piece can have a first side and a second side. The structure can have a first side and a second side. The tool tip can be configured to generate a stir zone via friction stir welding within the butt joint and/or the lap joint on at least one of the first side and second side of the butt joint and/or lap joint. In some embodiments, the tool tip can generate a weld bead in a geometric shape defied by the work-piece profile. In some embodiments, the removed portion can be formed by removal of at least a portion of a defective portion of the structure.

In some embodiments, the removed portion may have contained at least a portion of a defective portion of the structure, and the tool tip can be used to generate a weld bead completely around the work-piece profile of the work-piece.

In some embodiments, the member can be a work-piece having a work-piece profile configured to form a butt joint between the work-piece and an edge of a removed portion of a structure of an object and/or a lap joint between the work-piece and a portion of the structure, and the work-piece can be formed by being cut out of a work-piece sheet via the end mill bit.

In some embodiments, the work-piece can have at least one mounting boss configured to facilitate securing the mounting gear thereto.

In another exemplary embodiment, a repair welding system can include a work-piece having a work-piece profile. The work-piece profile may be configured to form a butt joint between the work-piece and an edge of a removed portion of a structure of an object and/or a lap joint between the work-piece and a portion of the structure. The system can further include a friction stir welding tool. The friction stir welding tool can include a mounting gear securable to a portion of the work-piece. The friction stir welding tool can further include a spindle arm rotatingly securable to the mounting gear. The spindle arm may further include a tool tip aperture. The friction stir welding tool can further include a drive gear rotatingly securable to the spindle arm and configured to engage the mounting gear. The friction stir welding tool can further include a tool tip configured to be received by the tool tip aperture. The tool tip aperture can be configured to rotatingly secure the tool tip to the spindle arm. The system can be configured such that when the drive gear is actuated, the spindle arm can be manipulated to cause the tool tip to traverse a path defined by the work-piece profile.

The system can further include a rotating motor unit configured to rotate at least one of the drive gear and the tool tip.

In another exemplary embodiment, a method of performing friction stir welding on a structure of an object can include securing a work-piece having a work-piece profile to the structure forming a butt joint and/or a lap joint between the work-piece and the structure. The method can further include mounting a friction stir welding tool to the work-piece. The friction stir welding tool can include a mounting gear securable to a portion of the work-piece. The friction stir welding tool can further include a spindle arm rotatingly securable to the mounting gear. The spindle arm may have a tool tip aperture. The friction stir welding tool can include a drive gear rotatingly securable to the spindle arm and configured to engage the mounting gear. The friction stir welding tool can include a tool tip configured to be rotatingly received by the tool tip aperture. The friction stir welding tool can be configured such that when the drive gear is actuated, the spindle arm can be manipulated to cause the tool tip to traverse a path defined by the work-piece profile. The method can further include actuating the drive gear to cause the drive gear to rotate. The method can further include actuating the tool tip to cause tool tip to rotate so that a weld beam comprising a friction stir weld may be generated along at least a portion of the butt joint and/or the lap joint.

In some embodiments, the method can further include identifying a defective portion of the structure that includes at least one defect in the structure. The method can further include defining a geometric shape of the defective portion. The geometric shape may surround at least a portion of the defect. The method can further include cutting the defective portion from the structure to generate a removed portion within the structure, the removed portion having the geometric shape. The method can further include generating the work-piece profile so that it matches the geometric shape of the defective portion.

While these potential advantages are made possible by technical solutions offered herein, they are not required to be achieved. Embodiments of the presently disclosed system and method can be implemented to achieve technical advantages, whether or not these potential advantages, individually or in combination, are sought or achieved.

Further features, aspects, objects, advantages, and possible applications of the present invention will become apparent from a study of the exemplary embodiments and examples described below, in combination with the Figures, and the appended claims.

One skilled in the art will readily appreciate that the embodiments disclosed herein are not mutually exclusive, and features from various embodiments may be combined or interchanged with features from other embodiments, which are all within the scope of the present invention.

BRIEF DESCRIPTION OF THE DRAWINGS

The above and other objects, aspects, features, advantages and possible applications of the present invention will be more apparent from the following more particular description thereof, presented in conjunction with the following drawings, in which.

DETAILED DESCRIPTION OF THE INVENTION

The following description is of an embodiment(s) presently contemplated for carrying out the present invention. This description is not to be taken in a limiting sense, but is made merely for the purpose of describing the general principles and features of the present invention. The scope of the present invention should be determined with reference to the claims.

Referring to FIGS. 1-2, an embodiment of the system 1 can include a Friction Stir Welding ("FSW") tool 2. In some embodiments, the FSW tool 2 can be configured as a portable unit. For example, the FSW tool 2 can be configured as a hand-held unit. In at least one embodiment, the FSW tool 2 can be used to perform a weld on a structure 4 in situ. This can include performing a weld on a portion of the structure 4 while the structure 4 (e.g., a hull or superstructure) remains intact with an object (e.g., a ship). For example, the FSW tool 2 can be used to weld a defective portion 10 (e.g., a crack in a panel) that has developed in a superstructure panel of a ship without having to remove the panel to perform the weld at a different location. In other words, the weld can be performed on the defective portion 10 of the panel in-place (i.e., in situ). Other examples can include welding a fuselage or cargo floor of an aircraft, a portion of a shipping container, etc.

Figure 2A:
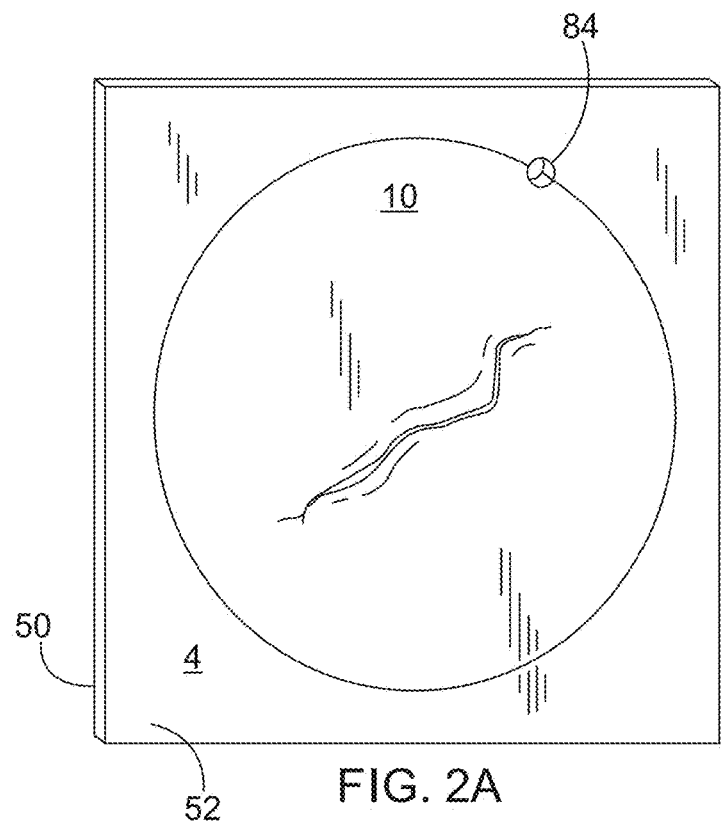
FIG. 2A shows a structure with a defective portion by which an embodiment of the FSW tool may be used to perform a repair thereon.
Figure 2B:
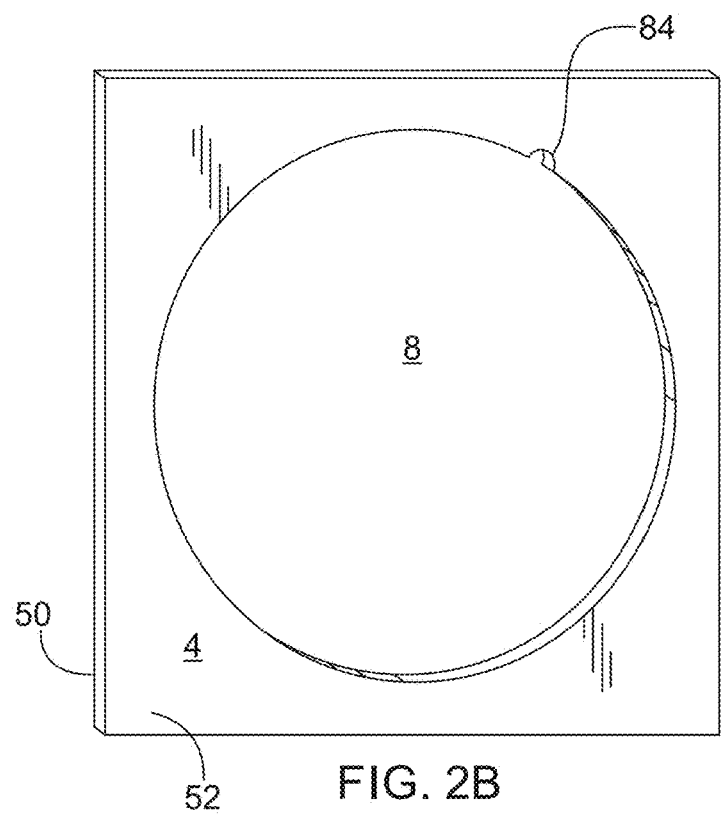
FIG. 2B shows a removed portion of the defective portion of FIG. 2A.
Figure 2C:
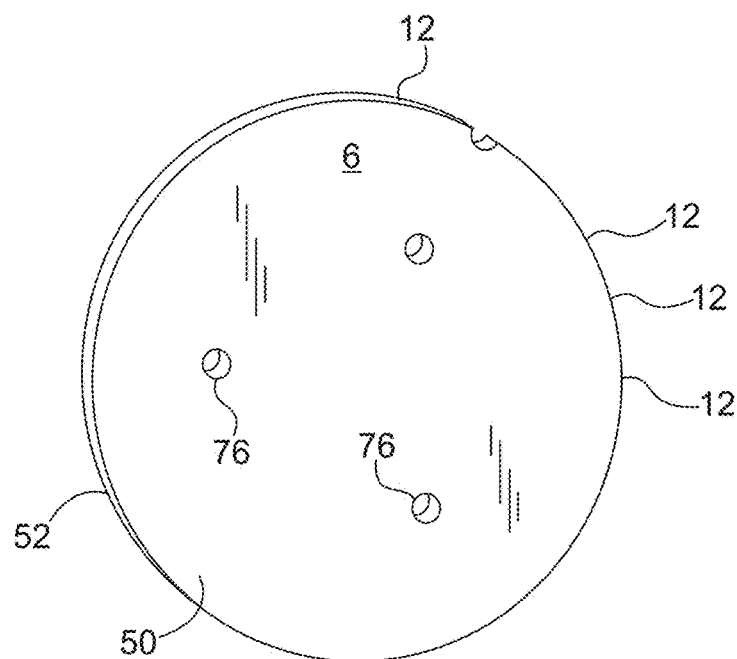
FIG. 2C shows an embodiment of a work-piece that may be used with an embodiment of the FSW tool.
Figure 2D:
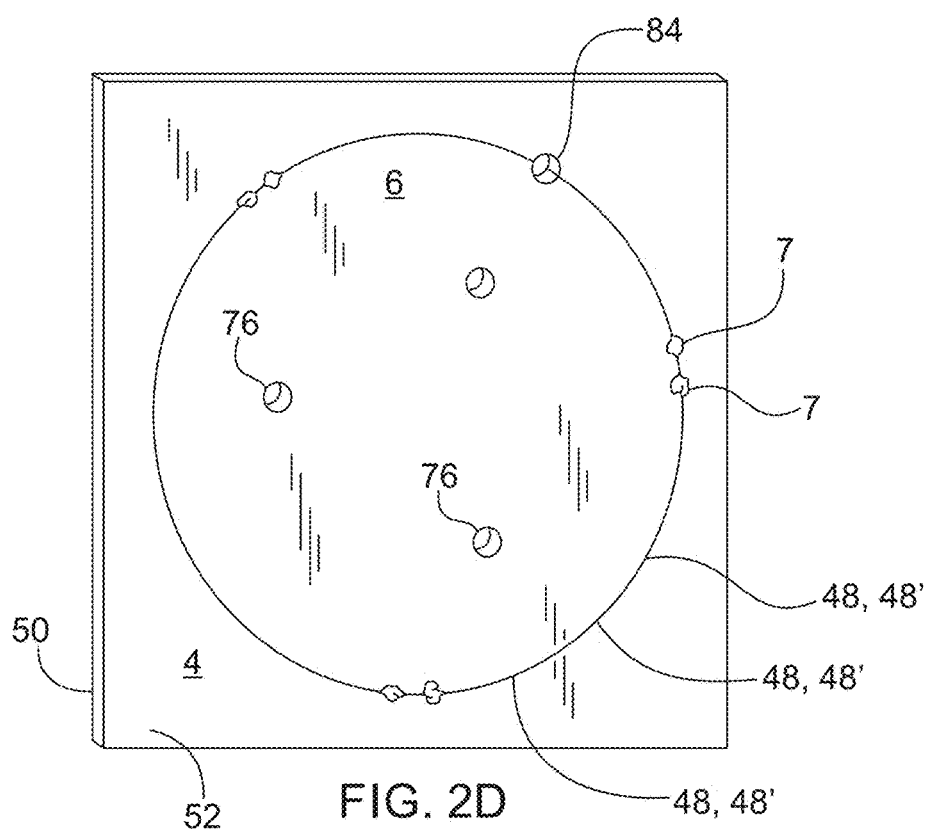
FIG. 2D shows and exemplary repair that may be performed by inserting an embodiment of the work-piece of FIG. 2C within the removed portion of FIG. 2B.

Some embodiments of the system 1 can include a work-piece 6. The work-piece 6 can be a member configured to be welded to the structure 4. The work-piece 6 can be configured to become part of the structure 4 after being welded thereto. For example, a portion of the structure 4 can be removed and the work-piece 6 can be welded to the structure 4 so as to take the place of the removed portion 8. As a non-limiting example, FIG. 2A shows a portion of the structure 4 having a defect (e.g., cracking, sensitization, experiencing fatigue, etc.). This defective portion 10 can be removed to generate the removed portion 8 in the structure 4 (see FIG. 2B). The work-piece 6 can be configured to be held in place within the removed portion 8 (see FIGS. 2C-D). The work-piece 6 can then be welded to the structure 4, or at least partially welded to the structure 4 (see FIG. 8). This can include welding the work-piece 6 to the structure 4 so as to become part of the structure 4. Welding the work-piece 6 to the structure 4 can replace the defective portion 10, and thus be used to maintain or repair portions of the structure 4. The weld can be done by friction stir welding, which may be performed with an embodiment of the FSW tool 2. For example, the FSW tool 2 can be used to generate the friction stir weld that welds the work-piece 6 to the structure 4.

The work-piece 6 can be a member that is the same, similar, or different shape and size as the defective portion 10, or as the portion would have existed before it became defective. The work-piece 6 can have a work-piece profile 12, which may be an outer perimeter of the work-piece 6. The work-piece profile 12 can be any geometric shape (e.g., circular, square, triangular, hexagonal, etc.). It is contemplated for an outer perimeter of the work-piece 6 to exhibit a work-piece profile 12 that is the same as or similar to a profile of the removed portion 8. The work-piece 6 can be a material that is the same as, similar to, or different from the material of the defective portion 10 and/or any other material of the structure 4.

An embodiment of the FSW tool 2 can include a spindle arm 14. The spindle arm 14 can be a member having at least one rotate pin aperture 16. The spindle arm 14 can be configured to rotate about an axis 3 defined by the rotate pin aperture 16. The spindle arm 14 may further include at least one tool tip aperture 18. The spindle arm 14 may further include at least one drive gear aperture 20. The spindle arm 14 can be any shape and size. It is contemplated for the shape and size of the spindle arm 14 to be such that as it is rotated about the axis 3 of the rotate pin aperture 16, the tool tip aperture 18 can follow at least a portion of the work-piece profile 12. The spindle arm 14 can be fabricated from a rigid material, such as metal, metal alloy, composite material, ceramic, etc. In one embodiment, the spindle arm 14 can be a triangular shaped plate. Each of the rotate pin aperture 16, tool tip aperture 18, and drive gear aperture 20 can be positioned at or near each apex of the triangular plate. It should be noted that the spindle arm 14 can be formed into any shape and size.

The rotate pin aperture 16 can be configured to receive a rotate pin 22 such that the spindle arm 14 can rotate about the axis 3 of the rotate pin aperture 16 without the rotate pin 22 hindering such rotation. The rotate pin aperture 16 may further include a rotator hub assembly, a bushing and bearing assembly, a bearing race assembly, etc. so as to facilitate smooth rotation of the spindle arm 14 about the rotate pin 14.

The tool tip aperture 18 can be configured to receive a tool tip 26 such that the tool tip 26 can rotate about an axis 5 of the tool tip aperture 18. The tool tip 26 can include a tip spindle end 28 and a tip working end 30. The tip spindle end 28 can be configured to be received by a chuck or other clamp of a rotating motor unit 32 (see FIG. 6). The rotating motor unit 32 can cause the tool tip 26 to rotate about the axis 5 of the tool tip aperture 18. The tip aperture 18 may also include a rotator hub assembly, a bushing and bearing assembly, a bearing race assembly, etc. so as to facilitate smooth rotation of the tool tip 26 relative to the spindle arm 14. The tip working end 30 can be fabricated from a material that is harder than the material of the structure 4 and/or the work-piece 6. The tip working end 30 can also be fabricated from a material that has a higher melting point temperature than that of the material of the structure 4 and/or the work-piece 6. For example, if the structure 4 and/or work-piece 6 is an aluminum alloy, the tip working end 30 can be a material that is harder than the aluminum alloy and a material that exhibits a higher melting temperature than that of the aluminum alloy. Examples of such materials can include tungsten-carbide, cobalt steel alloy, titanium nitride, etc.

Figure 3:
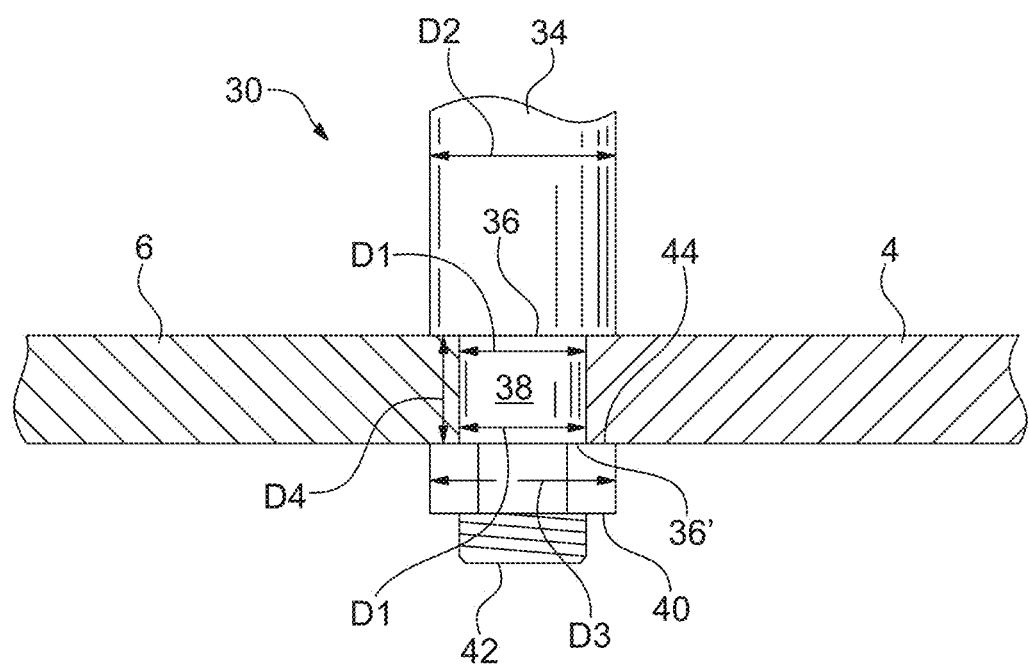
FIG. 3 shows a close up side view of an exemplary tool tip inserted within a butt joint formed between a work-piece and a structure.

Referring to FIG. 3, the tip working end 30 may include a shaft 34 with a terminus. The shaft 34 can have a cross-section that is cylindrical, cubic, triangular, etc. The shaft 34 can have a constant cross-sectional shape or a varying cross-sectional shape. For example, the shaft 34 may exhibit a taper, or be square at one end and cylindrical at another end, etc. The terminus can be flat, angled, undulated, toothed, grooved, etc. The terminus may be referred to as a shoulder 36. The shoulder 36 can further include a probe 38. The probe 38 can be a protraction extending from a surface of the shoulder 36. This can include extending perpendicularly or at any other angle. The probe 38 may have a diameter $D_1$ that is less than a diameter $D_2$ of the shaft 34 at the shoulder 36. The probe 38 can have a cross-section that is cylindrical, cubic, triangular, etc. The probe 38 can have a constant cross-sectional shape or a varying cross-sectional shape. For example, the probe 38 may exhibit a taper, or be square at one end and cylindrical at another end, etc.

In at least one embodiment, the tip working end 30 can include another shoulder 36'. This may be referred to as a bobbin-style tool tip 26. For example, the terminus of the shaft 34 can be a first shoulder 36. A body 40 can be located at or near a distal end 42 of the probe 38. The body 40 can be permanently affixed to the probe 38 or temporarily affixed thereto. The body 40 can be fabricated from a material, have a configuration, and/or have a cross-sectional shape that is the same as or different from that of the shaft 34. A surface of the body 40 can be a second shoulder 36'. The second shoulder 36' can have a shape and/or configuration that is the same as or different from that of the first shoulder 36. The body 40 at the second shoulder 36' can have a diameter $D_3$ that is greater than the diameter $D_1$ of the probe 38. In some embodiments, $D_3$ can equal $D_2$. In some embodiments, at least a portion of the probe 38 can be threaded and the body 40 can include a threaded aperture, where the threads of each correspond so as to facilitate temporarily securing the body 40 to the probe 38. For example, the distal end 42 of the probe 38 can be threaded so that the body 40 can be threadingly engaged with the probe 38.

It is contemplated for at least one of the work-piece 6 and the structure 4 to fit between the first shoulder 36 and the second shoulder 36' during welding operations. The upper surface 44 of the body 40 can then be the second shoulder 36'. Thus, the placement of the body 40 on the probe 38 may be configured to accommodate the thickness of at least one of the work-piece 6 and the structure 4 so as to facilitate placement of at least one of them between the first shoulder 36 and the second shoulder 36'. Placement of the body 40 on the probe 38 may be further configured to accommodate the thickness of multiple work-pieces 6 and/or structure 4 portions. The threading engagement between the distal end 42 of the probe 38 and the body can be further used to accommodate different thicknesses of the work-piece 6 and/or structure 4 by adjusting a distance $D_4$ between the first shoulder 36 and the second shoulder 36'.

In some embodiments, the probe 38 can exhibit a diameter $D_1$ near its interface with the first shoulder 36 and a diameter $D_1'$ near its interface with the second shoulder 36'. $D_1$ may be the same as or different from $D_1'$. For example, the probe 38 may exhibit a taper such that $D_1$ is greater than $D_1'$. Each of $D_1$ and/or $D_1'$ may still be less than of $D_2$ and/or $D_3$.

Figure 4A:
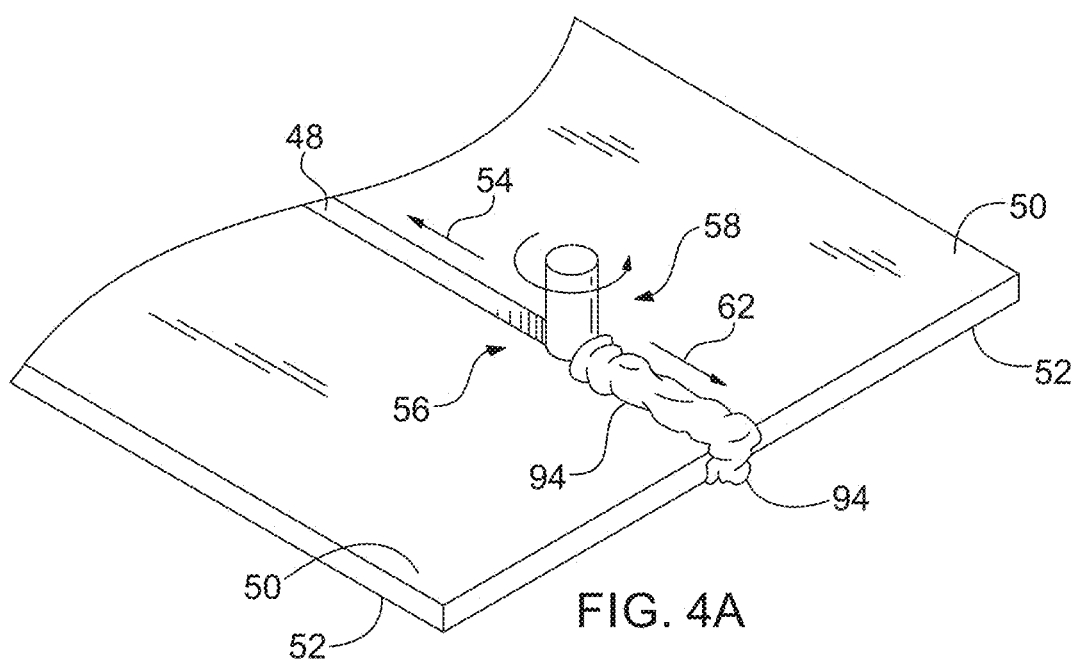
FIG. 4A shows an embodiment of a tool tip being rotated and traversed along a butt joint to generate a weld bead.
Figure 4B:
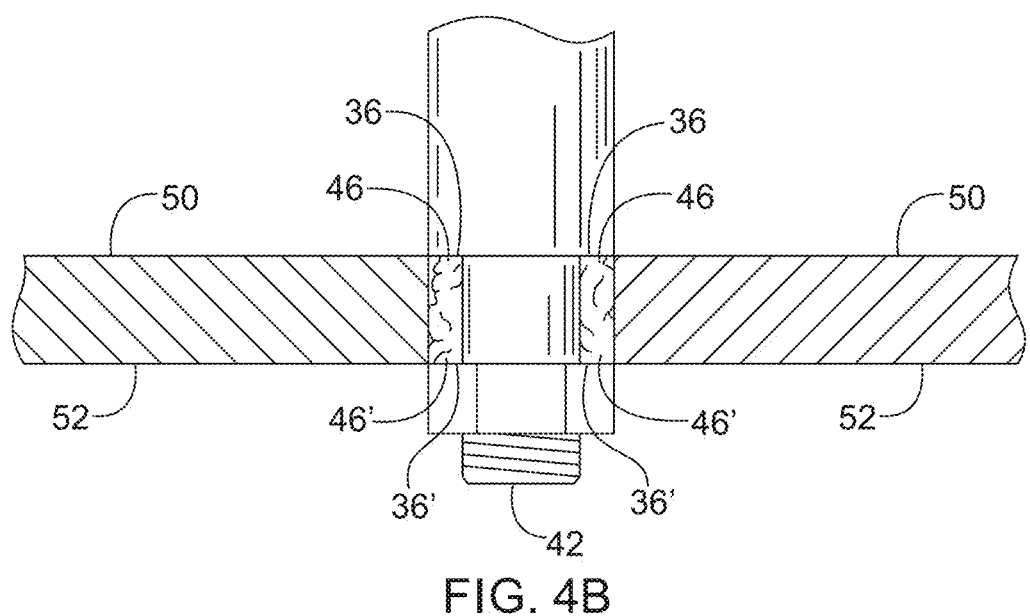
FIG. 4B is a cross-sectional view along the A-A line of FIG. 4A, showing an embodiment of the tool tip forming a stir zone within a region at or near the butt joint.
Figure 4C:
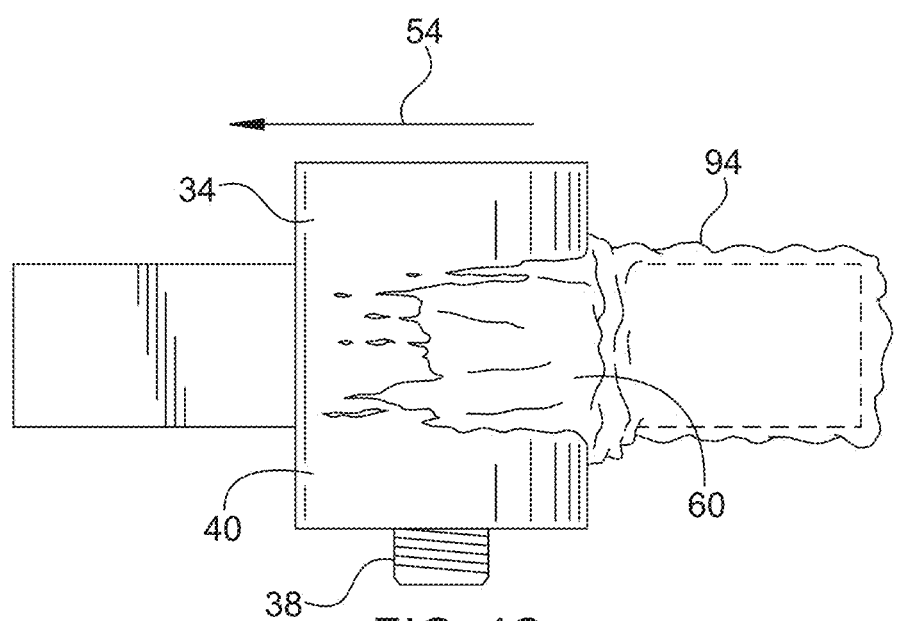
FIG. 4C is a cross-sectional view along the B-B line of FIG. 4A, showing an embodiment of the tool tip forming a weld region.

Referring to FIGS. 4A-4C, the tip working end 30 can be used to generate a stir zone 46, 46' within the work-piece 6 and/or structure 4. For example, the work-piece 6 can be positioned such that edges of the work-piece 6 are adjacent edges of the removed portion 8. This can include forming a butt joint 48 between edges of the work-piece 6 and edges of the removed portion 8. A butt joint 48 can be formed by aligning the edges of the work-piece 6 and the edges of the removed portion 8 so that the work-piece 6 and the structure 4 are in a same geometric plane, or at least the edges of the work-piece 6 and the edges of the removed portion 8 of the structure 4 are in a same geometric plane. Forming the butt joint 48 can further include generating an interface between the edges of the work-piece 6 and the edges of the removed portion 8 such that at least portions of the edges of each can be in contact with the first shoulder 36 and/or the second shoulder 36' while the probe 38 is placed within the interface (see FIG. 4B).

In addition, or in the alternative, the work-piece 6 can be configured and positioned such that edges of the work-piece 6 overlap edges of the removed portion 8. This can include forming a lap joint 48' between edges of the work-piece 6 and edges of the removed portion 8. A lap joint 48' can be formed by placing the edges of the work-piece 6 adjacent the edges of the removed portion 8 so that the work-piece 6 sits against the structure 4 in a geometric plane that is parallel to the geometric plane of the structure 4, or at least so that the edges of the work-piece 6 are in a geometric plane that is parallel to the geometric plane of the edges of the removed portion 8 of the structure 4. Forming the lap joint 48' can further include generating an interface between the edges of the work-piece 6 and the edges of the removed portion 8 such that at least a portion of one of the edges is in contact with the first shoulder 36 and/or the second shoulder 36'.

In some embodiments, the work-piece 6 can be welded to the structure 4 so as to be welded over top of the defective portion 10. For example, generating a lap joint 48' between the work-piece 6 and the structure 4 can facilitate welding the work-piece 6 to a portion of the structure 6 so as to weld the work-piece 6 over at least a portion of the defective portion 10. Furthermore, any portion of the defective portion 10 can be cut out to generate a removed portion 8. The work-piece 6 can be configured to be positioned such as to form both a butt joint 48 and a lap joint 48' with the structure 4. For example, the work-piece 6 may form a lap joint 48' with a portion of the structure 4 and a butt joint 48 with an edge of the structure 4 defined by the removed portion 8. Thus, the work-piece 6 may be used to cover a portion of the defective portion 10 and a removed portion 8. The FSW tool 2 may then be used to friction stir weld the work-piece 6 to the structure 4 in any manner described herein.

It should be noted that the FSW tool 2 and methods of use can be used for generating the structure 4, or at least a portion of the structure 4. Thus, the work-piece 6 need not be used as part of a repair. For example, the work-piece 6 can be caused to form a lap joint 48' with the structure 4 and be welded to the structure 4 to become part of the structure 4. Additionally, a removed portion 8 can be generated in the structure (the removed portion 8 not being used to cut out a defective portion 10) so that a work-piece 6 can be caused to form a butt joint 48' with edges of the structure 4 defined by the removed portion 8. Thus, the work-piece 6 can be caused to make any combination of lap joint 48' and/or butt joint 48 with the structure 4 for purposes of constructing the structure 4, or any portion of the structure 4. Once the butt joint 48 and/or lap joint 48' is generated, the FSW tool 2 can be used to weld the work-piece 6 to the structure 4 in any manner described herein. For example, the work-piece 6 can be used to perform double-plate welding operations.

At least one of the first shoulder 36 and the second shoulder 36' can be made to make contact with a surface the work-piece 6 and/or structure 4. For example, the first shoulder 36 can be made to make contact with a first side 50 of the butt joint 48 so as to be in contact with at least a portion of the first side 50 of the work-piece 6 and at least a portion of the first side 50 of the structure 4. The second shoulder 36' can be made to make contact with a second side 52 of the butt joint 48 so as to be in contact with at least a portion of the second side 52 of the work-piece 6 and at least a portion of the second side 52 of the structure 4.

The tool tip 26 can be caused to rotate, generating frictional heat and mechanically mixing of the work-piece 6 and/or structure 4 material(s) to generate at least one stir zone 46, 46' of plasticized material. The first shoulder 36 may generate a first stir zone 46 at or near the first side 50 of the butt joint 48. The second shoulder 36' may generate a second stir zone 46' at or near the second side 52 of the butt joint 48. The tool tip 26 can also be caused to traverse the butt joint 48. As the tool tip 26 is caused to rotate and caused to traverse the butt joint 48 in a forward direction 54, the tip working end 30 can cause the plasticized material to move from a retreating side 56 of the stir zone 46, 46', to an advancing side 58 of the stir zone 46, 46'.

At least one of the first shoulder 36 and the second shoulder 36' may be configured to contain the plasticized material within a weld region 60, as shown in FIG. 4C. The weld region 60 can be a volume of space that includes the stir zone 46 and that exists between the first shoulder 36 and the second side 52 of the butt joint 48. The weld region 60 can be a volume of space that includes the stir zone 46' and that exists between the second shoulder 36' and the first side 50 of the butt joint 48. The weld region 60 can be a volume of space that includes the stir zones 46, 46' and that exists between the first shoulder 36 and the second shoulder 36'.

As the tool tip 26 is caused to be rotated and to traverse the butt joint 48, the plasticized material can be caused to move from the forward direction 54 to the reward direction 62 and from the retreating side 56 of the stir zone 46, 46' to the advancing side 58 of the stir zone 46, 46'. This motion of the plasticized material and the first and second shoulders 36, 36' maintaining the plasticized material within the weld region 60 can cause the plasticized material to adequately fill in a void that exists between the work-piece 6 edge and the removed portion 8 edge. As the tool tip 26 moves along the butt joint 48 so that the first shoulder 36 and/or second shoulder 36' no longer define the weld region 60 in that portion of the stir zone 46, 46', the plasticized material can cool to the point where it is consolidate and support itself in a defined shape so as to form the weld bead 94. Thus, it is contemplated for the speed of the traverse motion of the tool tip 26 to be such that it facilitates adequate cooling of the plasticized material as the first and/or second shoulders 36, 36' no longer confine it within the weld region 60.

The tip working end 30 can include various shapes and configurations. The various shapes and configurations can facilitate generation of a desired type of weld and/or operation parameter of the FSW tool 2. Operational parameters of the FSW tool 2 may include the rotational rate of the tool tip 26, the feed rate (e.g., how fast the tool tip 26 is caused to traverses the butt joint 48 and/or lap joint 48'), dwell time (e.g., the amount of time the tool tip 26 remains within a stir zone 46, 46'), shoulder 36, 36' depth (e.g., how deep the shoulder 36, 36' extends into the work-piece 6 and/or structure 4), etc. For example, some configurations may be more beneficial for generating plasticized regions for a first type of material, while other configurations may be better for a second type of material. Other configurations may allow the tool tip 26 to be rotated faster/slower, traverse through the material faster/slower, generate less/more heat friction, produce a certain characteristic of plasticized material, etc. Different shapes and sizes may also be used to generate a stir zone 46, 46' and/or weld region 60 of a certain depth, a certain width, etc. For example, the depth at which the shoulder 36, 36' extends below the surface of the work-piece 6 and/or structure 4 can affect the weld. Thus, the various shapes, sizes, and configurations may be modified to produce a good quality weld. Producing a good quality weld can include generating adequate heat for material plasticity, but also controlling the amount of heat generated so as to mitigate deleterious effects to the work-piece 6 and/or structure 4. Examples of tip working ends 30 that may be used are disclosed in U.S. Pat. No. 6,669,075, which is incorporated herein by reference in its entirety.

Referring back to FIGS. 1A-1B, the drive gear aperture 20 can be configured to receive a drive gear 64 such that the drive gear 64 can rotate about an axis 7 of the drive gear aperture 20. The drive gear 64 can include a drive gear spindle end 66 and a drive gear working end 68. The drive gear spindle end 66 can be configured to be received by a chuck or other clamp of the rotating motor unit 32. The drive gear working end 68 can be toothed, splined, grooved, or have some other type of ridges to engage with another gear. The rotate drive gear aperture 20 may also include a rotator hub assembly, a bushing and bearing assembly, a bearing race assembly, etc. so as to facilitate smooth rotation of the drive gear 64 about the drive gear aperture 20. The drive gear 64 can be fabricated from a rigid material, such as metal, metal alloy, composite material, ceramic, etc. In some embodiments, the drive gear working end 68 can be a circular plate with a toothed outer surface extending at least partially around a circumference of the plate. Other geometric shapes of the plate can be used, such as an oblong shape, a cam shape, etc.

The FSW tool 2 can further include a mounting gear 70. The mounting gear 70 can have a rotate pin aperture 16'. The rotate pin aperture 16' can be configured to receive the rotate pin 22 that also is received by the rotate pin aperture 16 of the spindle arm 14. The rotate pin aperture 16' can be configured to allow the spindle arm 14 to be rotated relative to the mounting gear 70 without the rotate pin aperture 16' hindering such rotation. The mounting gear 70 can be fabricated from a rigid material, such as metal, metal alloy, composite material, ceramic, etc. The mounting gear 70 can be a circular plate with teeth, splines, grooves, or other type of ridges on its outer surface extending at least partially around a circumference of the plate. Other geometric shapes of the plate can be used, such as an oblong shape, a cam shape, etc. It is contemplated for the mounting gear 70 to engage with the drive gear working end 68. For example, the toothed surface of the drive gear 64 can engage with the toothed surface of the mounting gear 70.

The mounting gear 70 can further include at least one fastener aperture 72. The fastener aperture 72 can be configured to receive a fastener 74, which may include a bolt, a rivet a pin, etc. It is contemplated for the mounting gear 70 to be secured to the work-piece 6 by the fastener 74 being inserted through the fastener aperture 72 and engaging with the work-piece 6. This may include a temporarily securement. The fastener 74 may be used to hold the mounting gear 70 stationary as the spindle arm 14 is caused to rotate about the axis 3 of the rotate pin apertures 16, 16'. In some embodiments, rotating the spindle arm 14 relative to the mounting gear 70 can include rotating the spindle arm 14 while the mounting gear 70 is held stationary with the work-piece 6.

In at least one embodiment, the work-piece 6 can include at least one mounting boss 76 configured to receive the fastener 74. The mounting gear 70 may be secured to the work-piece 6 by inserting the fastener 74 through the fastener aperture 72 and into the mounting boss 76 of the work-piece 6. The fastener may be threated, such as a threaded bolt for example. An inside surface of the mounting boss 76 may also be threaded so that the threaded fastener 74 and the mounting boss 76 threadingly engage each other to secure the mounting gear 70 to the work-piece 6. The spindle arm 14 can then be rotatingly secured to the mounting gear 70 via the rotate pin 22. The drive gear 64 can then be made to engage the mounting gear 70.

Once assembled, the drive gear 64 can be caused to rotate, thereby following a path defined by the outer surface of mounting gear 70. The outer surface of the mounting gear 70 may exhibit a geometric shape that mimics the work-piece profile 12. Thus, as the drive gear 64 follows the path of the outer surface of the mounting gear 70, the spindle arm 14 can be caused to follow a similar path by rotating about the axis 3 of the rotate pin aperture 16. As the spindle arm 14 rotates, the tool tip aperture 18 can be caused to follow the path of the work-piece profile 12 (see FIG. 8).

Figure 5:
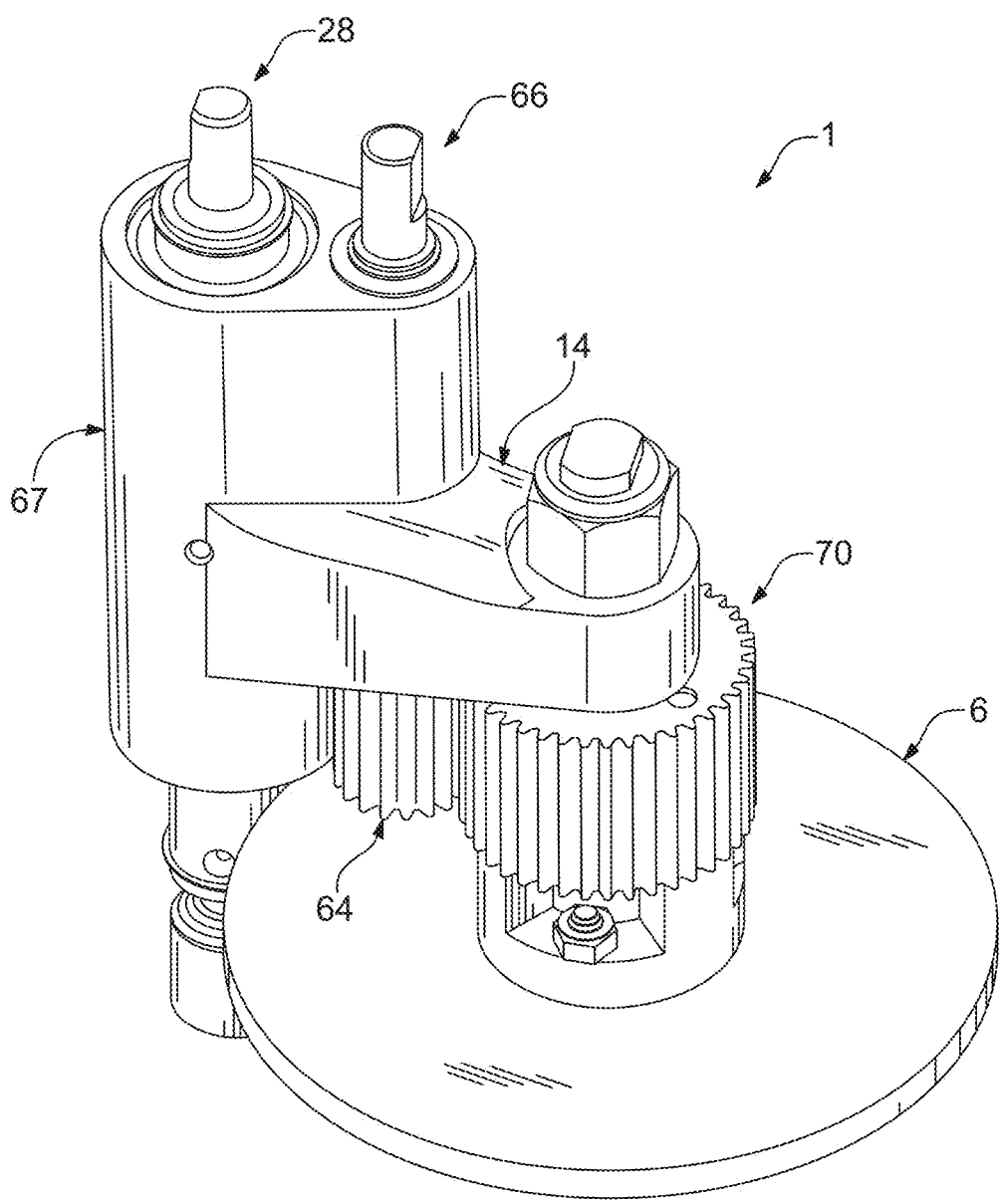
FIG. 5 shows another embodiment the system that includes an embodiment of the FSW tool in assembly with an embodiment of a work-piece.

It should be noted that the FSW tool 2 can include components of various sizes and shapes to meet a desired functionality or operation. For example, the FSW tool 2 of FIG. 5 shows a spindle arm 14 being attached to a cylindrical body 67. The spindle arm 14 can include the rotating pin aperture 16 through which the rotate pin 22 is inserted. The cylindrical body 67 can include the tool tip aperture 18 through with the tool tip spindle end 28 is inserted and the drive gear aperture 20 through which the drive gear spindle end 66 is inserted. Such a configuration can generate a more compact tool 2 that may be more easily manipulated.

Figure 6:
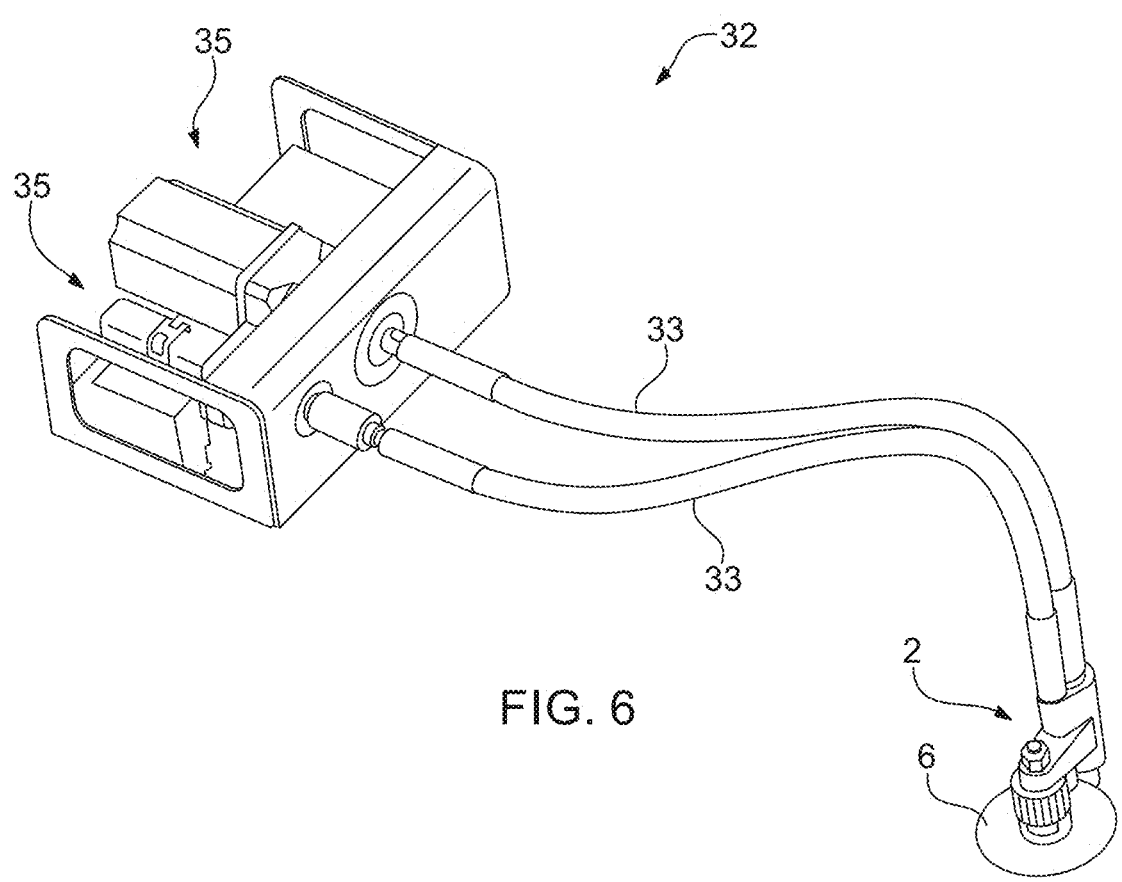
FIG. 6 shows an embodiment of a control module that may be used with an embodiment of the system.

Referring to FIG. 6, some embodiments of the system 1 can further include the rotating motor unit 32. The rotating motor unit 32 can be configured to connect to the drive gear spindle end 66 and/or the tool tip spindle end 28. The rotating motor unit 32 can be configured to cause the drive gear 64 and/or the tool tip 26 to rotate. Some embodiments can include a single rotating motor unit 32 to cause both the drive gear 64 and the tool tip 26 to rotate. Some embodiments can include a rotating motor unit 32 for the drive gear 64 and another rotating motor unit 32 for the tool tip 26. The rotating motor unit 32 can be a drive motor 35 with at least one flexible drive shaft 33; however, other rotary type drive tools can be used. The rotating motor unit 32 may further include at least one control module (not shown) to facilitate control of the rotational speed of the drive gear and/or the tool tip 26.

Figure 8:
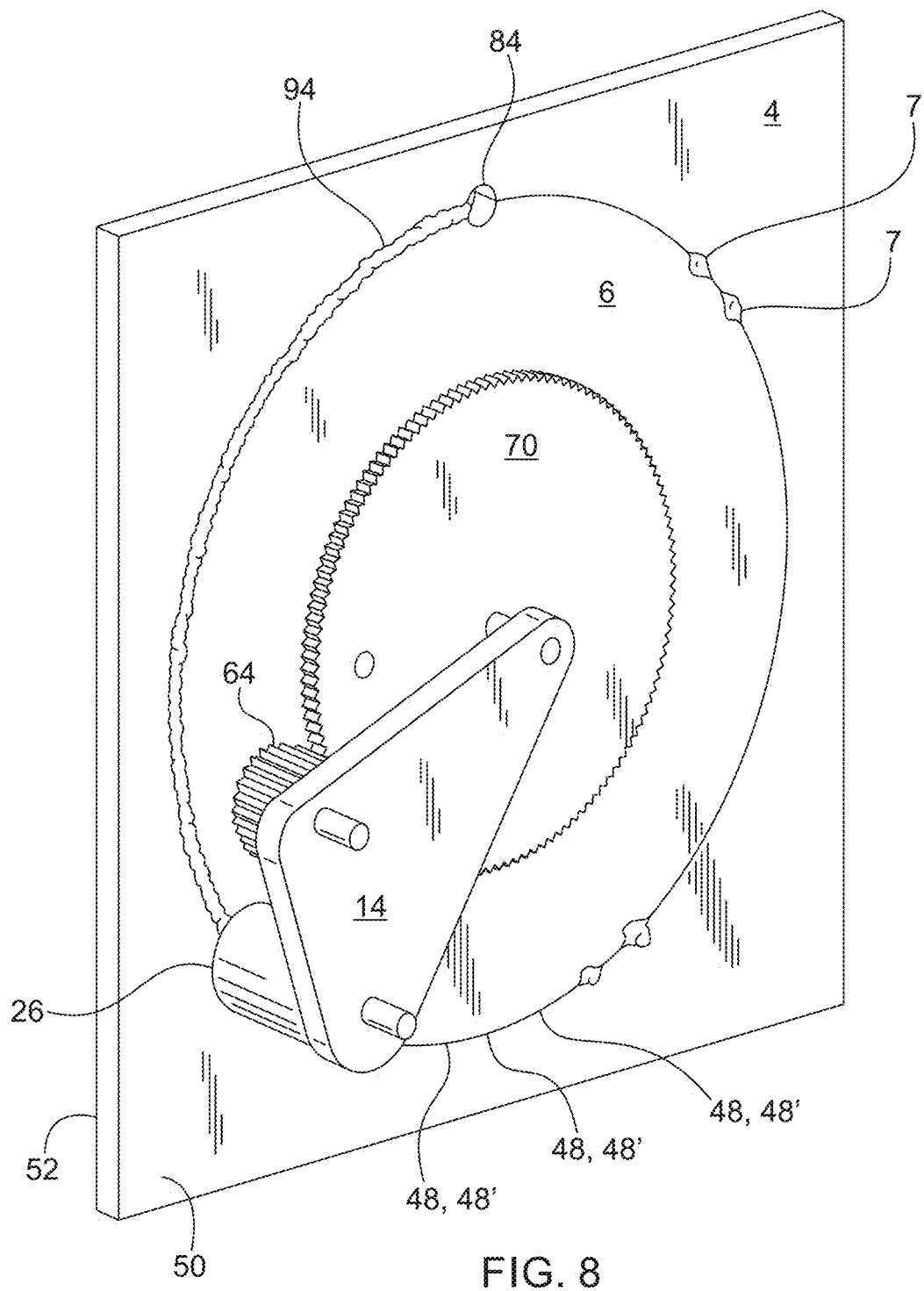
FIG. 8 shows an exemplary use of the system with a FSW tool being caused to form a weld bead along the butt joint formed between an embodiment of the work-piece and the structure.

Referring to FIG. 8, it is contemplated for the geometric shape of the mounting gear 70 to dictate the path the tool tip 26 will follow. For instance, if the mounting gear 70 is circular, the tool tip 26 can be caused to follow a circular path as the spindle arm 14 is caused to rotate. If the mounting gear 70 is oblong, the tool tip 26 can be caused to follow an oblong path as the spindle arm 14 is caused to rotate. It is further contemplated for the geometric shape of the mounting gear 70 to mimic the work-piece profile 12 and/or the geometric shape of removed portion 8 so that as the spindle arm 14 is caused to rotate, the tool tip 26 can be forced to follow the work-piece profile 12 and/or the edge of the removed portion 8. This can include causing the tip working end 30 to follow the butt joint 48 and/or lap joint 48'. Thus, if the removed portion 8 is circular, oblong, triangular, square, etc. in shape, the work-piece profile 12 can also be circular, oblong, triangular, square, etc. Further, the mounting gear 70 can also be circular, oblong, triangular, square, etc. The mounting gear 70 mimicking the shape of the work-piece profile 12 and/or removed portion 8 can allow the tool tip 26 to follow a desired path, and thus generate a weld bead 94 having a desired geometric shape.

Figure 9:
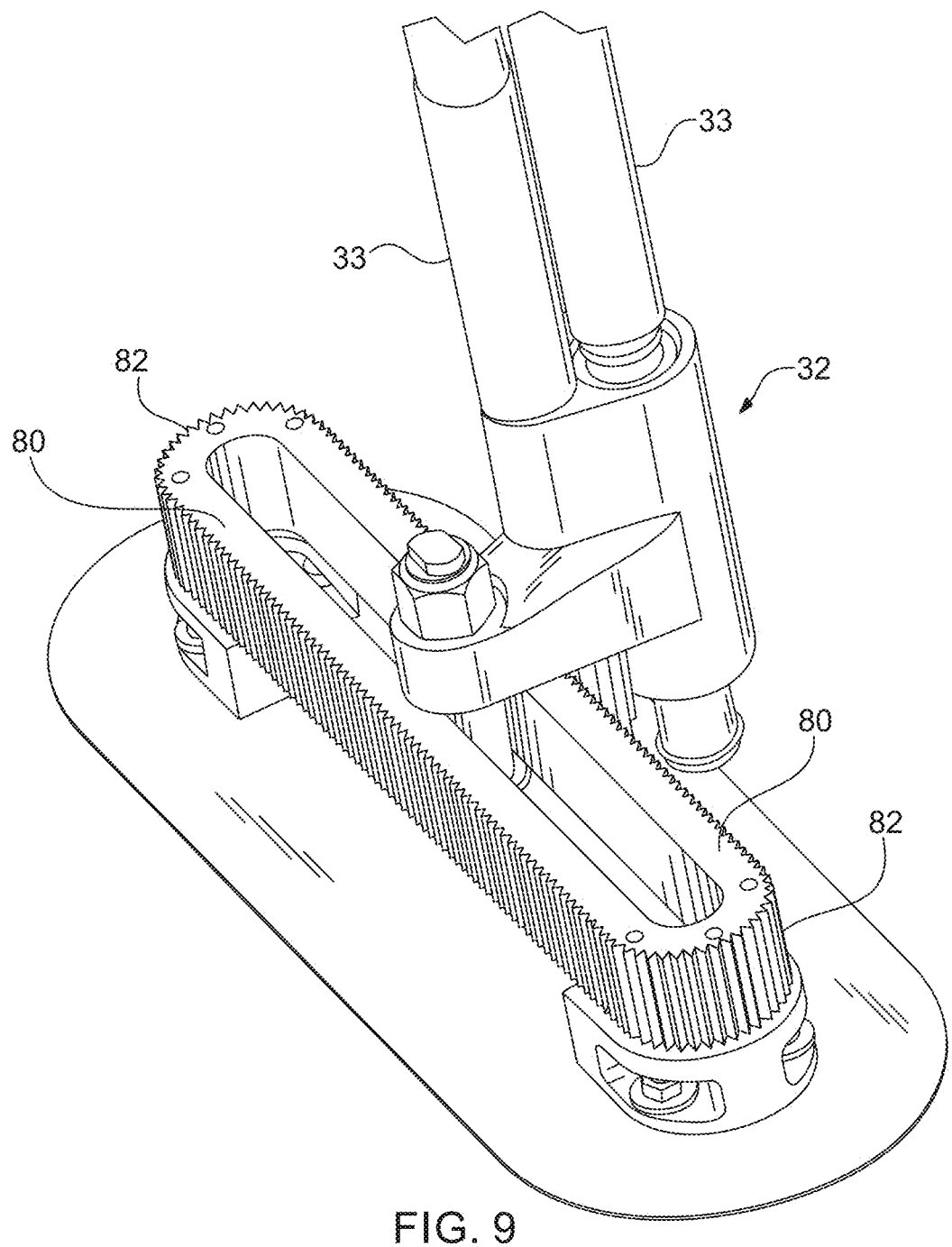
FIG. 9 shows an embodiment of a mounting gear having a rack portion and a bend portion to form an oblong shaped mounting gear. It should be noted that any shaped mounting gear can be formed with various combinations/configurations of the rack portion(s) and the bend portion(s).

Referring to FIG. 9, the mounting gear 70 can be configured as a unitary member or as an assembly of parts. For example, the mounting gear 70 can be configured as a unitary plate having the desired geometric shape, as shown in FIG. 1. FIG. 9 shows the mounting gear 70 including at least one rack portion 80 and at least one bend portion 82. A surface of the rack portion 80 and/or bend portion 82 can be toothed, splined, grooved, or have some other type of ridges to engage with another gear. The rack portion 80 can be straight, curved, curvilinear, etc. The bend portion 82 can be curved to facilitate the drive gear 64 to change direction as it traversed the bend portion 82.

In one embodiment, the mounting gear 70 can include a first straight rack portion 80 and a second straight rack portion 80, each in connection with a first 180-degree bend portion 82 and a second 180-degree bend portion 82 at their distal ends. This configuration can be used to generate a mounting gear 70 with an oblong geometric shape. Other geometric shapes can be generated with various other combinations of rack portions 80 and bend portions 82.

In at least one implementation, the system 1 can be used in the following manner. A defect can be located in a portion of a structure 4. The structure 4 can be part of an object. For example, the structure 4 can be a superstructure of a ship. A defective portion 10 of the structure 4 can be identified. This can include defining a geometric shape of the defective portion 10. A starter hole 84 can be formed in the structure 4 at or near the defective portion 10. This can be achieved by drilling the starter hole 84 into the structure 4. This can further include drilling the starter hole 84 so that the starter hole 84 extends from the first side 50 of the structure to the second side 52 of the structure 4. At least a portion of the defective portion 10 can be cut out from the structure 4 to generate a removed portion 8. This can include removing the entire defective portion 10 from the structure 4 to generate the removed portion 8. The defective portion 10 can be cut out using a hole saw, a reamer, a grinder, a torch, or other cutting tool, etc.

A work-piece 6 can be generated. The work-piece 6 can be generated before or after the removed portion 8 is generated. This may include cutting the work-piece 6 out from a work-piece sheet. In some embodiments, the work-piece 6 can be generated via pre-fabrication methods. Generating the work-piece 6 can include forming a work-piece 6 with a work-piece profile 12 that matches the geometric shape of the removed portion 8. In some embodiments, only a portion of the work-piece profile 12 may match the geometric shape of the removed portion 8. The work-piece profile 12 may be such that the edges of the work-piece 6 can be placed adjacent the edges of the removed portion 8. The work-piece 6 can be positioned within the removed portion 8 so that a butt joint 48 is generated between at least a portion of the edge of the work-piece 6 and at least a portion of the edge of the removed portion 8.

Alternatively, the work-piece profile 12 may be such that the edges of the work-piece 6 can be made to overlap the edges of the removed portion 8. The work-piece 6 can be positioned over top of the removed portion 8 so that a lap joint 48 is generated between at least a portion of the edge of the work-piece 6 and at least a portion of the structure 4. Alternatively, the work-piece profile 12 may be such that some of the edges of the work-piece 6 can be placed adjacent the some of the edges of the removed portion 8 and some of the edges of the work-piece 6 overlap edges of the removed portion 8 so that the work-piece can be made to be positioned over top of the removed portion 8 and/or other portion of the structure 4, forming both butt joints 48 and lap joints 48'.

The work-piece 6 can be secured to the structure 4. This can include securing the work-piece 6 to a portion of the structure 4 that has no defective portion 10. This can include securing the work-piece 6 to a portion of the structure 4 that has no removed portion 8. This can include securing the work-piece 6 over top of at least a portion of the defective portion 10. This can include securing the work-piece 6 to the structure 4 so that the work-piece 6 is at least partially inserted within the removed portion 8. Securing the work-piece 6 to the structure 4 can include welding a portion of the work-piece 6 to a portion of the structure 4. In one embodiment, at least a portion of the edge of the work-piece 6 can be tack welded 7 to at least a portion of the edge of the removed portion 8. Other means to secure the work-piece 6 to the structure 4 can be used. These may include use of consumable rivets, for example. The work-piece 6 can be secured to the structure 4 such that at least one mounting boss 76 extends outward from the first side 50.

The mounting gear 70 can be secured to the work-piece 6. This can include sliding the mounting boss 76 through the fastener aperture 72 of the mounting gear 70. This can further include inserting the fastener 74 through the fastener aperture 72 and into the mounting boss 76. For example, a threaded bolt can be inserted through the fastener aperture 72 and may be threadingly engaged with the mounting boss 76.

The spindle arm 14 can be secured to the mounting gear 70. This can include inserting the rotate pin 22 through the rotate pin apertures 16, 16'. The spindle arm 14 can be secured to the mounting gear 70 so that at least one of the drive gear spindle end 66 and the tool tip spindle end 28 can be facing outward from the first side 50. The spindle arm 14 can be secured such that the drive gear 64 is caused to engage with the mounting gear 70. The spindle arm 14 can be secured such that the tip working end 30 is inserted through the starter hole 84. The tip working end 30 can be positioned such that at least one of the first shoulder 36, the second shoulder 36', and the probe 38 can be made to make contact with butt joint 48 and/or lap joint 48'. In at least one embodiment, at least one of the first shoulder 36 and the second shoulder 36' can be made to make contact with a surface the work-piece 6 and/or structure 4, which may include the probe 38 making contact with at least one edge of the work-piece 6 and/or at least one edge of the removed portion 8.

In some embodiments, the body 40 can be adjusted so that the distance $D_4$ between the first shoulder 36 and the second shoulder 36' is set to a desired distance. The adjustment can be done before or after the tool tip 26 is inserted through the starter hole 84. For example, the distance $D_4$ between the first shoulder 36 and the second shoulder 36' can be set such that there is amble space to position the butt joint 48 and/or the lap joint 48' between the first shoulder 36 and the second shoulder 36'. The distance $D_4$ can then be adjusted such that at least one of the first shoulder 36 and the second shoulder 36' makes contact with the butt joint 48 and/or the lap joint 48'.

In some embodiments, the body 40 can be removed from the probe 38 before or after insertion of the tool tip 26 through the starter hole 84. The system 1 may then be used without the body 40.

Figure 7:
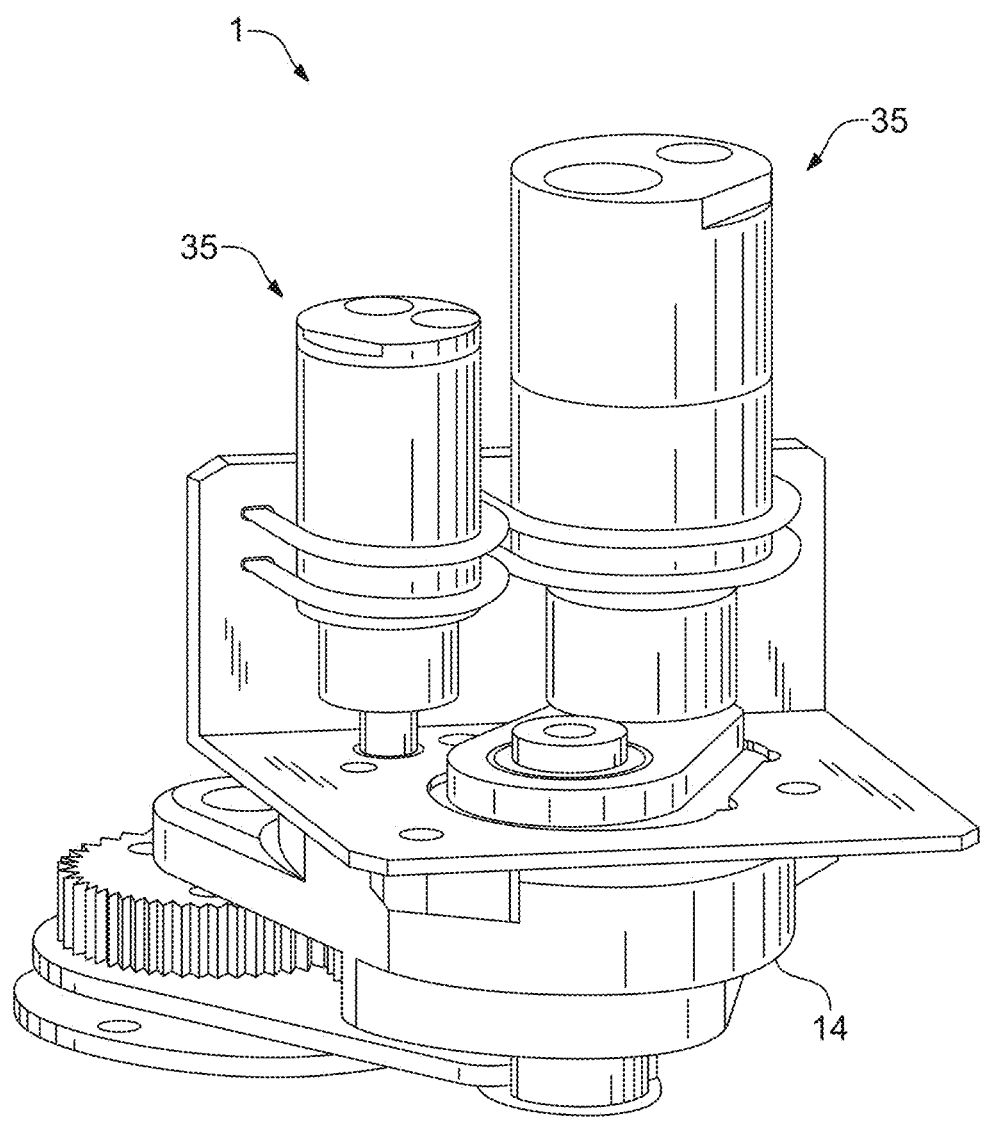
FIG. 7 shows another embodiment the system that includes an embodiment of the FSW tool in assembly with pneumatic motors directly mounted to a portion of the tool.

The tool tip 26 can be caused to rotate in any direction. The drive gear 64 can be caused to rotate in any direction. In some embodiments, the tool tip 26 and the drive gear 64 can be caused to rotate simultaneously. Causing the tool tip 26 and/or the drive gear 64 to rotate can be achieved by the rotating motor unit 32. The starting, stopping, and speed of rotation of each of the tool tip 26 and/or drive gear 64 can be controlled via the control module. The control module can be configured for independent control of the tool tip 26 and the drive gear 64. In some embodiments, the control module can include a processor associated with a non-transitory memory. The non-transitory memory can include software that can be executed by the processor. The processor can cause the control module to control rotational speed and/or acceleration of the drive gear 64 and/or the tool tip 26. For example, for electric and/or hydraulic drive motor units 35, algorithms can be used to set certain rotational speeds and/or accelerations of the drive gear 64 and/or the tool tip 26. An algorithm can include a ramp function, for example. Algorithms can also be used to coordinate rotational speeds and/or accelerations between the drive gear 64 and the tool tip 26. For pneumatic drive motor units 35 (see FIG. 7), pressure/flow regulators may be used. The rotational speed(s) and/or acceleration(s) can be set based on variables, which may include the rotational speed of the drive gear 64 and/or tool tip 26 set by a user, the material of the structure 4, the material of the work-piece 6, the material of the tool tip 26, the shape and configuration of the tool tip 26, the shape and configuration of the drive gear 64, the shape and configuration of the mounting gear 70, etc. As a non-limiting example, the rotating motor unit 32 may be operated such that the tool tip 26 traverses the butt joint 48 path and/or lap joint 48' path at a rate of 5.0 inches per minute when the structure is an aluminum alloy.

The tool tip 26 can be caused to rotate to generate the stir zone 46, 46'. The drive gear 64 can be rotated to cause the tool tip 26 to generate the stir zone 46, 46' along the butt joint 48 and/or lap joint 48'. The tool tip 26 and the drive gear 64 can be rotated to generate the stir zone 46, 46' along the butt joint 48 and/or lap joint 48' so as to form plasticized material around at least a portion of the work-piece profile 12. The tool tip 26 and the drive gear 64 can be further rotated to allow the plasticized material to cool and consolidate so as to friction stir weld at least a portion of the work-piece 6 to the structure 4. The tool tip 26 and the drive gear 64 can be further rotated to allow the plasticized material to cool and consolidate so as to friction stir weld the entire work-piece 6 to the structure 4. For example, the tool tip 26 and the drive gear 64 can be rotated so that the tool tip 26 follows the entire work-piece profile 12, starting at the starter hole 84 and ending back at the starter hole 84. This may include friction stir welding the tack welds 7 that were used to secure the work-piece 6 to the structure 4.

In some embodiments, little to no stir zone 46, 46' may be generated at the starter hole 84, and thus a friction stir weld can be generated between the entire work-piece 6 and the structure 4 except for the starter hole 84.

The spindle arm 14 can then be removed from the mounting gear 70. The mounting gear 70 can then be removed from the work-piece 6. Alternatively, the mounting gear 70 can be removed from the work-piece 6 with the spindle arm 14 still attached to the mounting gear 70. To remove the spindle arm 14 away from the structure 4, the tool tip 26 may be slid out from the starter hole 84. This can include sliding the body 40 through the starter hole 84 while the body 40 is still attached to the probe 38. Alternatively, the body 40 can be removed from the probe 38 so that the tool tip 26 can be slid out from the starter hole 84 without the body 40. Removing the body 40 from the probe 38 may require access to the second side 52 of the structure 4.

In some embodiments, the mounting boss 76 of the work-piece 6 can be removed after the work-piece 6 is welded to the structure 4. This can be achieved by cutting, grinding, chiseling, etc. the mounting boss 76.

In some embodiments, the FSW tool 2 can be used to cut out the defective portion 10. For example, an end mill bit (not shown) can be inserted in the tool tip aperture 18. The starter hole 84 can then be generated in any manner described herein. The mounting gear 70 can be secured to the structure 4 at or near the defective portion 10. This can be achieved by inserting a fastener 74, such as a mounting bolt, a rivet, etc., through the fastener aperture 72 and into the structure 4 so as to engage with the structure 4. The spindle arm 14 can be secured to the mounting gear 70 in any manner described herein so as to cause a working end of the end mill bit to be inserted through the starter hole 84. The rotating motor unit 32 can be used in any manner described herein to cause the end mill bit to rotate and traverse a path defined by the mounting gear 70 so as to cut out the defective portion 10 and generate the removed portion 8. The end mill bit can then be replaced with the tool tip 26 so that the FSW tool 2 may be used to weld the work-piece 6 in any manner described herein.

As noted above, the work-piece 6 can be generated by cutting the work-piece 6 out from a work-piece sheet. The end mill bit and the disclosed methods of use with the FSW tool 2 can also be used to cut the work-piece 6 from the work-piece sheet.

Embodiments of the FSW tool 2 and methods of use can repair a defective portion 10 of a structure 4, exhibiting a superior repair as compared to merely welding the defect. This can be done by replacing a portion of the structure 4 surrounding the defect as opposed to merely welding the defect (e.g., welding the crack). Removing a portion of the structure 4 surrounding the defect can facilitate a repair that actually removes the defect and/or any sensitized portions of the structure 4 and further facilitate replacing that portion with a work-piece 6 that may be free of any defects and/or sensitized material. Further, use of the work-piece 6 with the system 1 can facilitate a repair with a tougher weld bead 94 because the weld bead 94 is controlled and matched a preferred geometric profile of the work-piece 6 as opposed to being limited to the geometric shape of the defect (e.g., the crack). The FSW tool 2 and method of use further facilitates performing a repair in situ.

The preferred geometric shape of the work-piece 6, and thus the preferred geometric shape of the work-piece profile 12 can facilitate resolving the mechanical forces that may be required to stabilize the tool tip 26, to cause the tool tip 26 to traverse along the work-piece 6 and/or structure 4, and to hold the work-piece 6 stationary during the process. For example, analyses can be performed to determine which geometric shapes would generate certain control and manipulation requirements. The analyses can be used to determine which geometric shapes and FSW tool 2 configurations can be used to minimizing such forces.

Figure 1A:
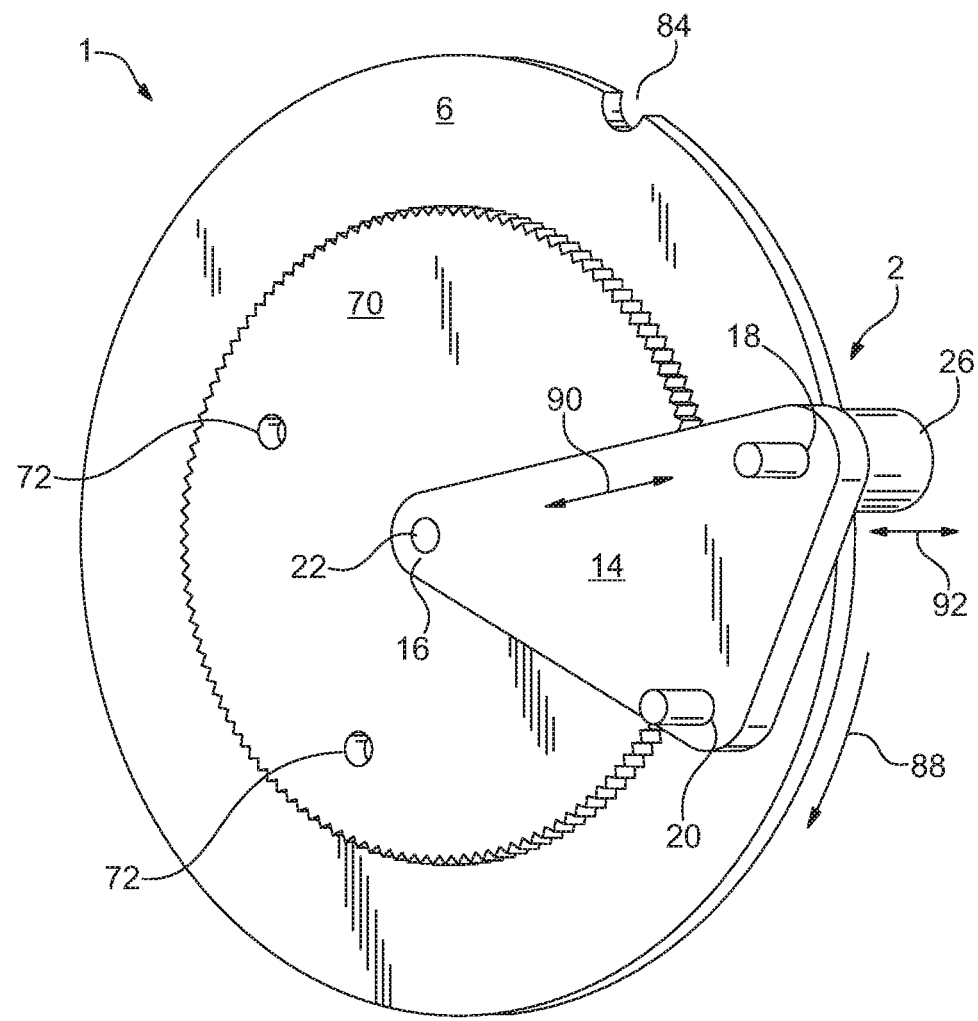
FIG. 1A shows a perspective view of embodiment of the system that includes an embodiment of a Friction Stir Welding ("FSW") tool in assembly with an embodiment of a work-piece.
Figure 1B:
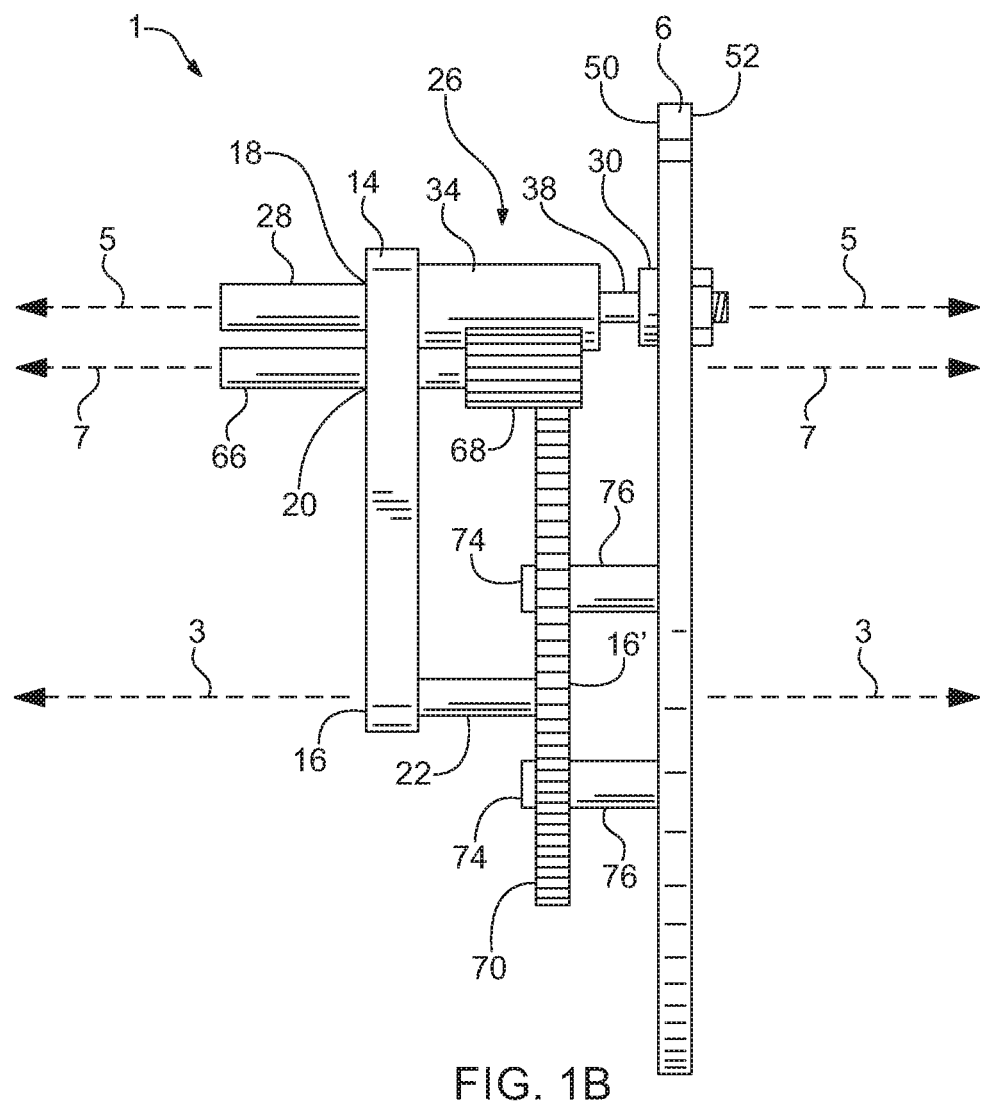
FIG. 1B shows a side view of an embodiment of the system shown in FIG. 1A.

Referring to FIG. 1A, as a non-limiting example, using the FSW tool 2 with a work-piece profile 12 that is circular may experience an X-axis circumferential force 88, a Y-axis radial force 90, and a Z-axis vertical force 92. The Z-axis vertical force 92 may be resolved within the tool tip 26 and the Y-axis radial force 90 may be resolved within the spindle arm 14 if a bobbin-style tool tip 26 is used. With a circular work-piece profile 12, for example, the X-axis circumferential force 88 can be low when compared to the other forces. The X-axis circumferential force 88 can be controlled via the rotational rate and the feed rate, which may be further controlled by the control module. The work-piece 6 with a circular work-piece profile 12 is one example of how the system 1 and method of use can be used to provide a portable, in-situ, full-penetrating friction stir weld with a self-reacting tool 2, while demonstrating the functions of drive manipulation and control.

In some embodiments, the FSW tool 2 and method of use may be suitable for installation of inserts into a plate for repair and/or insertion of new construction details. The system 1 can obviate use of a track or other features that may otherwise be required with use of a work-piece 6 when prior art methods and systems are utilized. Further, the FSW tool 2 can be configured to provide its own means of locomotion. The FSW tool 2 can be further configured to fully leverage the advantages of self-reacting so as to not require any fixtures to resolve plunge or weld forces, aside from the FSW tool 2 itself. The FSW tool 2 can be assembled from the first side 50 of the structure 4 with no portion on the second side 52, other than the probe 38 and/or body 40. Furthermore, mechanical forces can be mitigated to such a degree so as to enable remote mounting of prime movers, connected by flexible connections, which can enable welding in any orientation.

The system 1 can be used without guide rails, either attached separately or integral to the work-piece 6 being joined to the structure 4. For example, the FSW tool 2 can be guided by the weld head's rotation about the central axis. In some embodiments, the weld process can be limited to a circular path about the point of rotation, and may be determined by the size of the weld head itself. The size of the weld head can include a distance between the central post (e.g., rotate pin 22) and the centerline of the spindle arm 14. Thus, the system 1 can be used to perform small, circular (or other shaped) inserts in-situ, at any desired location into the plate of the assembled structure 4.

Additional understanding and information related to the system 1 and methods of use can be obtained from the materials attached as an appendix to this application.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

We claim:

1. A tool, comprising:
   a mounting gear securable to a portion of a planar member, the mounting gear having a rotate pin aperture;
   a spindle arm rotatingly securable to the mounting gear, the spindle arm further comprising a tool tip aperture and a pin aperture;
   a drive gear rotatingly securable to the spindle arm and configured to engage the mounting gear;
   at least one of a tool tip and an end mill bit, each configured to be received by the tool tip aperture; and,
   a rotating pin configured to be inserted through both the rotate pin aperture of the mounting gear and the pin aperture of the spindle arm so as to allow the spindle arm to be rotated relative to the mounting gear;
   wherein the tool tip aperture is configured to rotatingly engage with each of the tool tip and the end mill bit independently; and,
   wherein when the drive gear is actuated, the spindle arm is manipulated to cause the tool tip aperture to traverse a path defined by a geometric shape of the mounting gear.

2. The tool recited in claim 1, wherein the planar member is at least one of a structure of an object and a work-piece.

3. The tool recited in claim 1, wherein the end mill bit is configured to cut through the planar member.

4. The tool recited in claim 1, wherein the tool tip is configured to generate at least one stir zone within the planar member via friction stir welding.

5. The tool recited in claim 1, wherein:
   the planar member is a work-piece having a work-piece profile configured to form a butt joint between the work-piece and an edge of a structure of an object or a lap joint between the work-piece and a portion of the structure;
   the tool tip is configured to generate at least one stir zone within the work-piece and the structure via friction stir welding when the tool tip is within the tool tip aperture and the tool tip is caused to rotate.

6. The tool recited in claim 1, wherein the tool tip is configured as a bobbin-style tool tip for friction stir welding.

7. The tool recited in claim 1, wherein the tool tip further comprises a shaft forming a first shoulder, a probe extending from the first shoulder, and a body forming a second shoulder.

8. The tool recited in claim 7, wherein the body is removably attached to the probe.

9. The tool recited in claim 7, wherein a distance between the first shoulder and the second shoulder is adjustable.

10. The tool recited in claim 1, wherein:
    the planar member has a first side and a second side;
    the mounting gear is securable to the first side;
    the tool tip is configured to generate a stir zone via friction stir welding within at least one of the first side and the second side of the planar member.

11. The tool recited in claim 5, wherein:
    the work-piece has a first side and a second side;
    the structure has a first side and a second side;
    the tool tip is configured to generate a stir zone via friction stir welding within the butt joint or lap joint on at least one of the first side and second side of the butt joint or lap joint.

12. The tool recited in claim 5, wherein the tool tip generates a weld bead in a geometric shape defied by the work-piece profile.

13. The tool recited in claim 1, wherein the planar member is a work-piece having a work-piece profile configured to form a butt joint between the work-piece and an edge of a structure of an object or a lap joint between the work-piece and a portion of the structure, and the work-piece is formed by being cut out of a work-piece sheet via the end mill bit.

14. The tool recited in claim 5, wherein the work-piece has at least one mounting boss configured to facilitate securing the mounting gear thereto.

15. A system, comprising:
    a work-piece having a work-piece profile, the work-piece profile configured to form a butt joint between the work-piece and an edge of a structure of an object or a lap joint between the work-piece and a portion of the structure; and,
    a friction stir welding tool, comprising:
      a mounting gear securable to a portion of the work-piece, the mounting gear having a rotate pin aperture;
      a spindle arm rotatingly securable to the mounting gear, the spindle arm further comprising a tool tip aperture and a pin aperture;
      a drive gear rotatingly securable to the spindle arm and configured to engage the mounting gear;
      a tool tip configured to be received by the tool tip aperture, the tool tip aperture configured to rotatingly engage with the tool tip; and,
      a rotating pin configured to be inserted through both the rotate pin aperture of the mounting gear and the pin aperture of the spindle arm so as to allow the spindle arm to be rotated relative to the mounting gear;
    wherein when the drive gear is actuated, the spindle arm is manipulated to cause the tool tip to traverse a path defined by the work-piece profile.

16. The system recited in claim 15, further comprising a rotating motor unit configured to rotate at least one of the drive gear and the tool tip.

* * * * *